(12) United States Patent
Kabbani et al.

(10) Patent No.: US 9,419,887 B1
(45) Date of Patent: Aug. 16, 2016

(54) MINIMUM LATENCY ROUTING

(71) Applicant: Google Inc., Mountain View, CA (US)

(72) Inventors: Abdul Kabbani, Los Gatos, CA (US); Amin Vahdat, Los Altos, CA (US)

(73) Assignee: Google Inc., Mountain View, CA (US)

( * ) Notice: Subject to any disclaimer, the term of this patent is extended or adjusted under 35 U.S.C. 154(b) by 351 days.

(21) Appl. No.: 13/921,585

(22) Filed: Jun. 19, 2013

(51) Int. Cl.
*G06F 13/00* (2006.01)
*H04L 12/729* (2013.01)
*H04L 12/721* (2013.01)
*H04L 12/701* (2013.01)

(52) U.S. Cl.
CPC ............ *H04L 45/125* (2013.01); *H04L 45/00* (2013.01); *H04L 45/12* (2013.01)

(58) Field of Classification Search
USPC .................................. 709/238, 239, 241, 223
See application file for complete search history.

(56) References Cited

U.S. PATENT DOCUMENTS 6,963,927 B1 *  11/2005  Lee et al. ....................... 709/241
7,633,867 B2 *  12/2009  Kodialam ............... H04L 45/12
                                                                  370/231
8,370,496 B1      2/2013  Marr
8,392,575 B1      3/2013  Marr
9,143,398 B2 *    9/2015  Liu ....................... H04L 41/0668
2003/0227924 A1 * 12/2003  Kodialam ............... H04L 45/12
                                                                  370/395.21
2014/0185432 A1 *  7/2014  Liu ....................... H04L 41/0668
                                                                  370/228

FOREIGN PATENT DOCUMENTS

EP           1949622         3/2010
WO      WO 2011/113582       9/2011

* cited by examiner

*Primary Examiner* — Kenneth R Coulter
(74) *Attorney, Agent, or Firm* — McDermott Will & Emery LLP (57) ABSTRACT

Systems and methods for managing computer network activity are disclosed. A data flow to be transmitted between a source node and a destination node can be identified. An initial graph representing the computer network can be determined. A shortest path between the source node and the destination node can be identified based on the graph. Bandwidth can be allocated to communication links along the shortest path between the source node and the destination node. It can be determined whether a bandwidth requirement associated with the data flow is satisfied by the allocated bandwidth. A residual graph can be determined. The steps of identifying a shortest path between the source node and the destination node based on the residual graph and allocating bandwidth to communication links along the shortest path between the source node and the destination node can be repeated.

18 Claims, 8 Drawing Sheets

MINIMUM LATENCY ROUTING

FIELD OF THE INVENTION

The present disclosure relates generally to systems and methods for reducing network latencies.

BACKGROUND

Network latencies limit the maximum rate at which data can be transmitted across a network. Per-hop queuing, switching, and propagation delay contribute to latency in networks, including networks in data centers.

SUMMARY

In one aspect, a computer-implemented method for managing computer network activity is disclosed. The method includes identifying, by a routing determination module, a data flow having a bandwidth demand including a plurality of network packets to be transmitted between a source node and a destination node in the computer network. The method includes obtaining an initial network graph for the computer network. The method includes determining a routing allocation for the data flow by performing an iterative process until the bandwidth demand of the data flow has been satisfied. The iterative process includes identifying, by the routing determination module, a shortest path between the source node and the destination node based on a most recently obtained network graph. The iterative process includes allocating for the data flow, by the routing determination module, bandwidth to communication links along the identified shortest path. The iterative process includes determining, by the routing determination module, whether the bandwidth demand associated with the data flow is satisfied by the allocated bandwidth. In response to determining that the bandwidth demand of the data flow has not been satisfied, the iterative process includes obtaining, by the routing determination module, a residual graph. The method includes outputting the determined routing allocation to the source node.

In another aspect, a system for managing computer network activity is disclosed. The system includes a plurality of network nodes and a routing determination module. The routing determination module is configured to identify a data flow having a bandwidth demand including a plurality of network packets to be transmitted between a source node and a destination node in the computer network. The routing determination module is configured to obtain an initial graph for the computer network. The routing determination module is configured to identify a routing allocation for the data flow by performing an iterative process. The iterative process includes identifying a shortest path between the source node and the destination node based on a most recently obtained network graph. The iterative process includes allocating bandwidth for the data flow to communication links along the identified shortest path. The iterative process includes determining whether the bandwidth demand associated with the data flow is satisfied by the allocated bandwidth. In response to determining that the bandwidth demand of the data flow has not been satisfied, the iterative process includes obtaining a residual graph. The routing determination module is configured to output the determined routing allocation to the source node.

In a further aspect, a non-transitory computer-readable storage medium is disclosed. The non-transitory computer-readable storage medium is encoded with instructions which, when executed by a processor, cause the processor to perform a method for managing computer network activity. The method includes identifying a data flow having a bandwidth demand including a plurality of network packets to be transmitted between a source node and a destination node in the computer network. The method includes obtaining an initial network graph for the computer network. The method includes determining a routing allocation for the data flow by performing an iterative process until the bandwidth demand of the data flow has been satisfied. The iterative process includes identifying a shortest path between the source node and the destination node based on a most recently obtained network graph. The iterative process includes allocating bandwidth for the data flow to communication links along the identified shortest path. The iterative process includes determining whether the bandwidth demand associated with the data flow is satisfied by the allocated bandwidth. In response to determining that the bandwidth demand of the data flow has not been satisfied, the iterative process includes obtaining a residual graph. The method includes outputting the determined routing allocation to the source node.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and form a part of this specification.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

The present disclosure describes systems, methods and computer-readable media for reducing latencies in a computer network. The network may be a network in a data center or a network between data centers, or any suitable network outside of a data center. In some implementations, the network may include a plurality of nodes, including at least one source node and at least one destination node.

Figure 1:
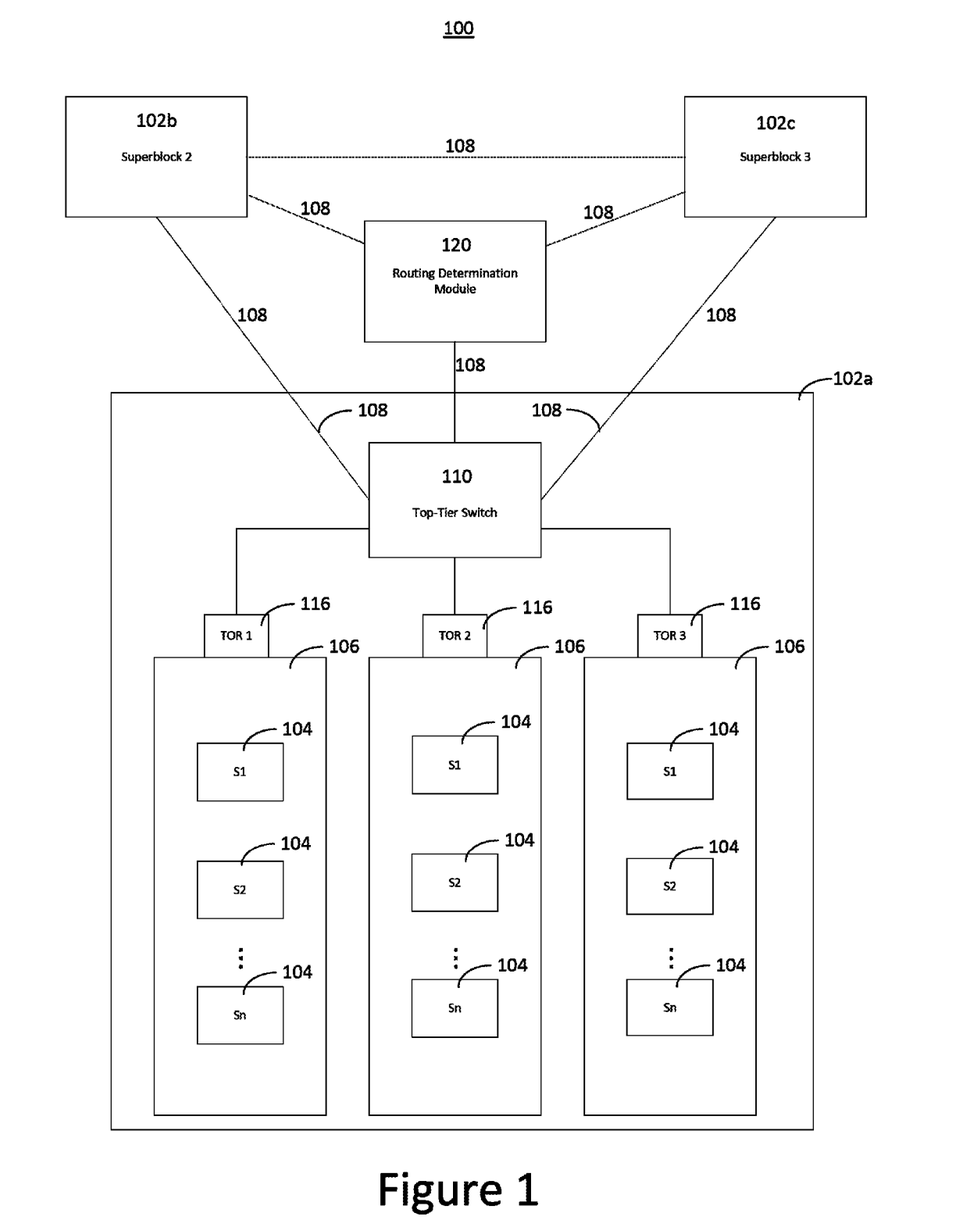
FIG. 1 is a block diagram of an example data center.

FIG. 1 is a block diagram of an example data center 100. The data center 100 includes several interconnected superblocks 102a, 102b and 102c (generally referred to as superblocks 102). Each superblock 102 includes on the order of several hundred to more than one thousand servers 104 arranged in server racks 106. The server racks 106 and servers 104 are connected to one another. For example, each server rack 106 includes a top-of-rack (TOR) switch 116 for handling data communications into and out of a given server rack 106. The superblocks 102 are communicatively coupled to one another by optical and/or electrical communication links 108 coupled to a switch 110.

Delays in transmission of data of a network, for example, a network in or connected to the data center 100, may occur for a variety of reasons. Such delays limit the maximum rate at which data can be transmitted across a network. The delays may result from the time required for queuing, switching, and propagating data between each pair of nodes in a given data path. In some implementations, the time required for transmission of data between a pair of nodes (also referred to as a "hop") can be substantially the same for every pair of nodes in the network. Therefore, reducing the number of hops in a data path can help to reduce the total latency a packet experiences along a path from its source to its destination.

A data center, such as the data center 100, may experience generally persistent or repeated communications that have predictable bandwidth requirements. In addition, network traffic in some data centers may be heavy, and such data centers may benefit from having routes planned out in advance to reduce the need for routing table look ups and to avoid bottlenecks. If an amount of bandwidth needed for a particular flow in the network can be ascertained in advance, routes for traffic associated with that flow can be planned prior to sending the first packet. Such information can be also used to divide up traffic associated with that flow across different routes at appropriate percentages. A data center in which traffic is so routed may permit traffic to be allocated across links in a network in a proactive rather than a reactive manner, reducing traffic bottlenecks.

The path between a source node and a destination node in a network, such as the data center 100, may span multiple intermediate nodes. The connection between a first node and a next node in the network is often referred to as a "link" that joins the first and second nodes together. A link can refer to both a physical and a logical network connection between interconnected network nodes. A data packet may traverse a plurality of links as it is transmitted from a source node to a destination node. As mentioned above, each link along a path can also be referred to as a "hop." In general, the amount of time it takes for a unit of network traffic, such as a packet, to traverse the route (in terms of its number of hops) from a source node to a destination node increases as the number of hops through which the communication passes along the route increases.

In a data center such as the data center 100, routing for a particular flow can be determined prior to sending a first packet when an amount of bandwidth needed for a particular flow in the network is obtained in advance, as described above. Hence, traffic associated with that flow can be divided across different routes at appropriate percentages. For example, if it is known that a given flow requires five units of bandwidth, and those five units of bandwidth are supplied using, e.g., ten routes, half a unit of the traffic associated with that flow can be sent over each route. The percentages do not have to be even, as some links may have greater capacities, and/or some of their respective capacities may already be dedicated to other flows or other routes for the same flow.

Allocation of units of bandwidth may be performed, in some implementations, by a route determining utility or a route determination module (described in more detail below). Bandwidth allocations may, in some implementations, be enforced by rate limiters provided in the network at any of the nodes. Such rate limiters may be implemented, for example, by any suitable combination of hardware and/or software. Alternatively, software incorporated in the routing software at each node can be configured to enforce the routing percentages determined by the processes described herein.

In the context of a data center, such as the data center 100, packets are often routed from one server 104 in a first superblock 102 to another server 104 in a second superblock 102. In many cases, the packets cannot be routed directly from the first superblock 102 to the second superblock 102. Instead, the packets are passed through one or more intermediate superblocks as they are routed from the first superblock 102 to the second superblock 102. In other implementations, data may be transmitted between a source node and a destination node within the same superblock 102. For example, first and second servers 104 within the same superblock 102 may act as source and destination nodes, respectively.

Referring again to FIG. 1, in order for the data center to obtain an efficient routing scheme for predictable flows traversing the network, the data center 100 includes a routing determination module 120. The routing determination module 120 can be implemented as a standalone computing device, or it can be implemented on one of the servers 104 included in the data center 100. In some implementations, each source node in the network may store and execute its own instance of the routing determination module 120. The routing determination module 120 can be implemented either entirely in hardware, or as a combination of hardware and software. For example, the routing determination module 120 can be implemented as computer readable instructions stored on a tangible computer readable medium. When the computer readable instructions are executed by a processor, such as a general purpose processor of one of the servers 104, the instructions cause the processor to carry out the functionality described further below and in relation to FIG. 2 pertaining to routing within the data center 100.

In general, the routing determination module 120 is configured to identify a set of routes that the topology of the data center network accommodates. The routing determination module 120 can determine an initial graph of the network, for example, when its full capacity is available. The routing determination module 120 identifies a set of links between nodes in the graph. The routing determination module 120 can also identify the bandwidth demands of each of a set of flows, routes that connect the source node of another flow to the destination node of each flow, the length of the route, and additional information associated with the route. The routing determination module 120 can be used to allocate bandwidth along such routes to the flows using the iterative process described below.

In some implementations, the routing determination module 120 is further configured to find all of the shortest paths between a source node and a destination node based on the initial graph. The routing determination module 120 can then determine a residual graph based on the initial graph after one or more links included in the shortest paths between the source and destination nodes through the initial graph have been saturated (i.e., their bandwidth ahs been fully allocated). A residual graph of a network is a graph of the network that remains after one or more links are removed from the initial graph (or a previously computed residual graph). For example, the routing determination module 120 can determine the residual graph by removing the saturated links from the initial graph, and any links and/or nodes that are only reachable through such removed links. The residual graph then includes the nodes and links that remain after the saturated links have been removed from the initial graph. In some implementations, the routing determination module can determine residual graphs and the shortest paths through such graphs iteratively, with each successive residual graph computed by removing the saturated links from the previous residual graph.

In some implementations, the routing determination module 120 can be configured to route network traffic so as to increase throughput along the routes corresponding to the shortest paths as identified by the routing determination module 120. In some implementations, the throughput is increased in accordance with a max-flow min-cut solution on a subgraph of the residual graph including all of the shortest paths previously identified on the residual graph. The max-flow min-cut theorem states that the maximum amount of throughput between a source node and a destination node is equal to the minimum capacity that, when removed from the network in a specific way, causes the situation that no network traffic can pass between the source node and the destination node. In addition, in some implementations, the routing determination module 120 is configured to monitor network traffic and is configured to determine when shortest paths in a residual graph of the network have been saturated.

Figure 2:
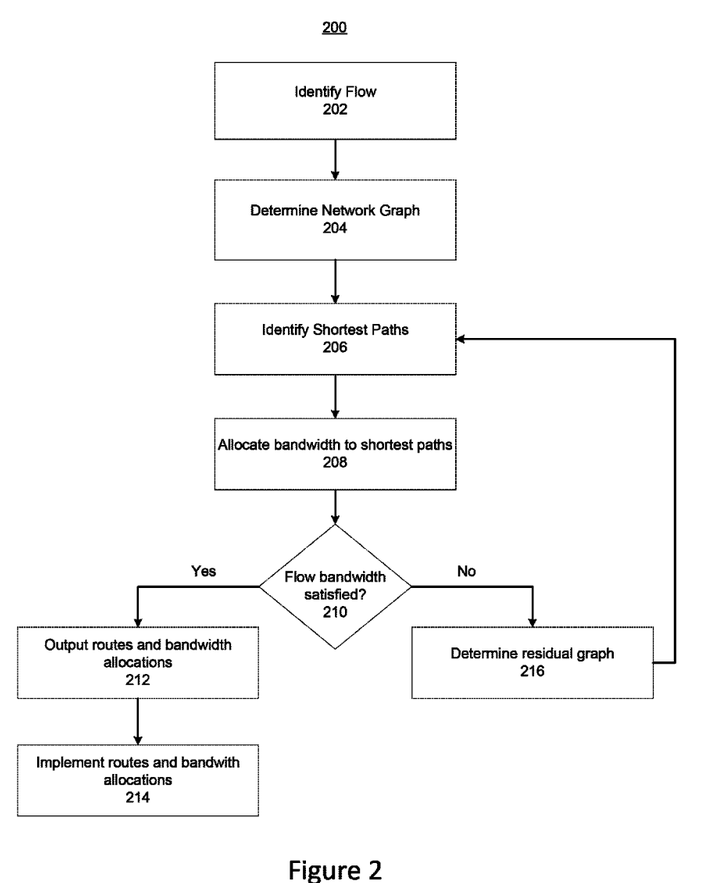
FIG. 2 is a flow diagram of an example method for routing network traffic.

FIG. 2 is a flow diagram of an example method 200 for routing network traffic. In brief overview, the method 200 includes identifying a flow of data to traverse a network (stage 202); determining an initial graph of network connections (stage 204), identifying a set of shortest paths for the identified flow (stage 206), allocating bandwidth for the flow to the identified shortest paths (stage 208), and determining whether the flow bandwidth has been satisfied (stage 210). The method 200 further includes, if the flow bandwidth is satisfied, outputting routes and bandwidth allocations (stage 212) and implementing the bandwidth allocations (stage 214). If the flow bandwidth is not satisfied, the method 200 further includes determining a residual graph (stage 216), identifying the shortest paths for the flow on the residual graph, and allocating flow bandwidth to the newly identified shortest paths (stage 206).

More particularly, the method 200 includes identifying a data flow (stage 202). In some implementations, the identification of a data flow may be performed by a module such as the routing determination module 120 shown in FIG. 1 (stage 202). In a network such as the data center 100, a data flow may be determined as any transmission of information between networked devices. For example, data flows may exist between any pair of superblocks 102, or between servers 104 within a single superblock 102 or a pair of superblocks 102. In some implementations, a data flow maybe identified predictably in advance. In some implementations, tasks involving communication between network nodes (e.g., superblocks 102) may be scheduled to occur at regular intervals. For example, a data backup process in which data stored on one superblock 102 is transmitted to a second superblock 102, may be scheduled to occur at a known time. In some implementations, the amount of data to be transferred and a time in which the data must be transferred may also be known in advance.

The method 200 includes determining a graph of a network (stage 204). In some implementations, the graph can be an initial graph of network connections within the data center in which none of the links are saturated. In some other implementations, the initial graph may take into account existing data traffic, which may reduce the bandwidth available on some or all of the links. In some implementations, a module such as the routing determination module 120 shown in FIG. 1 may be connected to all of the nodes in the network. Such a module may determine the topology of the network by broadcasting requests to all of the network nodes and recording the information received from the nodes in response to the broadcast request. In other implementations, the network topology may be known in advance. For example, network topology information may be stored in a database connected to the network.

A graph of the network can be determined (stage 204) based on the network topology. Nodes in the network can be represented as vertices of the graph. Links in the network can be represented as edges of the graph. In some implementations, there may be more than one link connecting a pair of nodes. The weights assigned to the edges of the graph can correspond to the number of links available between the nodes or the throughput that can be achieved between the nodes.

The method 200 includes identifying a first set of shortest path routes between a source node and a destination node in the network (stage 206). In some implementations, identification of shortest paths is accomplished by a broadcasting process. In a first stage of the broadcasting process, each node in the network can broadcast its position relative to the source node. For example, the first stage of the broadcasting process can begin with the source node itself broadcasting its zero-position (i.e., zero hops from the source node) to all of its neighboring nodes (i.e., all of the nodes that are one hop away from the source node). A node registers its position to be one greater than the position announced in the first broadcast message it receives. For example, the nodes neighboring the source node would register their positions as one hop from the source node, because the source node broadcasts its position to its neighbors as zero. The first stage of the broadcasting process can be performed iteratively, with each node calculating its own position, recording the list of nodes that have received the broadcast message in previous iterations, and then broadcasting their positions and on-route lists to their neighbors. In some implementations, after a node has received a broadcast message, the node can ignore broadcast messages received in subsequent iterations.

After the destination node receives broadcast messages from its neighbors, the list of all nodes on paths that lead to the destination node can be backtracked in a second stage of the broadcasting process. For example, the second stage of the broadcasting process can begin with the destination node broadcasting the list of its on-route neighboring nodes. Any neighboring node included on that list recursively broadcasts its list of on-route neighbors, and this backtracking process is repeated until the source node is reached. The set of all shortest paths between the source node and the destination node includes all of the nodes involved in the second stage of the broadcasting process and the links from which they received their first broadcast message.

The identification of shortest path routes may be performed both with respect to an initial graph and any number of residual graphs. In some implementations, the shortest path identification process may include registering, by each node, its position and a compilation of broadcasts by other nodes. For example, each node within the network may register its position to be the position announced in the broadcast messages it receives following the first received message. In some implementations, at least one node can be configured to compile a listing of all received messages regarding the relative positions of other network nodes. For example, in some implementations, each node compiles a log or otherwise retains information corresponding to a history or archive of messages emitted from neighboring nodes. In some implementations, the log may be updated after each broadcast iteration.

The method 200 includes allocating flow bandwidth to the shortest paths that were previously identified (stage 208). In some implementations, each of the shortest paths can process one unit of network traffic. The allocation of bandwidth therefore depends on how many shortest paths exist. For example, if the source node is directly connected to the destination node by a single link, the shortest path will be the direct connection between the source node and the destination node (i.e., a one-hop path). Therefore, all of the bandwidth would be allocated to this link (until the link becomes saturated). In another example, the source node and destination node may not be directly connected, meaning that there is no one-hop path. In such a network, if there are three two-hop paths connecting the source and destination nodes, then each of these paths could be allocated an equal share of the bandwidth. Therefore, one third of the network traffic associated with the flow between the source node and destination nodes would be allocated to each of the three two-hop paths, until all three two-hop paths are saturated. In some implementations, the allocation of bandwidth is performed by the routing determination module 120 shown in FIG. 1.

In some implementations, the method 200 can identify paths of various lengths, as described further below. Bandwidth can be then be allocated in a manner that reduces latency in the routing of data packets. For example, in some implementations, shorter paths are assigned a higher priority than longer paths. Therefore, shorter paths may be allocated more bandwidth than longer paths.

The method 200 includes determining whether the flow bandwidth demands have been satisfied (stage 210). In some implementations, the determination can be made based on the characteristics of the data flow identified in stage 202, the shortest paths identified in step 206, and the allocation of bandwidth made in stage 208. For example, the identified data flow may require 2 units of bandwidth. If only one shortest-path link has been identified, then that link (again assuming its capacity is equal to one unit) will not be capable of satisfying the 2 unit bandwidth requirements of the flow. However, if two or more shortest-path links have been identified, the bandwidth requirement for the data flow can be satisfied.

If the bandwidth demands for the flow are satisfied, the method 200 includes outputting the routes and bandwidth allocations (stage 212). In some implementations, the routing paths and bandwidth allocations can be stored at each node in the network. For example, the routing determination module 120 shown in FIG. 1 can determine the routing paths and bandwidth allocations for a given flow, as described above. The routing determination module 120 can then transmit the routing paths and bandwidth allocations to the network nodes before the data flow is processed.

The method 200 includes implementing the routes and bandwidth allocations (stage 214). In some implementations, the network nodes can store the routing and bandwidth information for a given data flow, and can implement the routes and bandwidth allocations when the transmissions associated with the flow occur. For example, if it has been determined that there are two paths from the source node to the destination node and that each path should receive an equal amount of bandwidth, the source node can execute the allocation by transmitting half of the data packets associated with the flow to a neighboring node on the first path and half of the data packets to the neighboring node on the second path. Other nodes along the paths can process the data packets in a similar manner. In some implementations, the source node can transmit the packets according to a source routing protocol that indicates in the header of each packet the specific set of nodes it is to traverse on route to the destination node.

On the other hand, after bandwidth has been allocated to a set of shortest paths, if the bandwidth demands for the flow are not yet satisfied, the method 200 includes determining a residual graph (stage 216). A residual graph can be determined by removing any links from the previous graph whose bandwidth was fully allocated in the prior bandwidth allocation stage (stage 208). Removing the saturated links from the graph allows additional bandwidth to be allocated based on the next shortest path determinations. Examples of residual graphs are described further below in connection with FIGS. 3A-3C and FIG. 4A-4C. Once the residual graph has been determined (stage 216), the method 200 includes repeating the steps described above with respect to stages 206-210. After the residual graph has been obtained (stage 216), the shortest paths that are identified (stage 206) may be a second set of shortest path routes between the source node and the destination node determined based on the residual graph. Such a second set of shortest path routes allow for additional units of traffic to traverse routes within the second set of shortest path routes (stage 208).

Figure 3A:
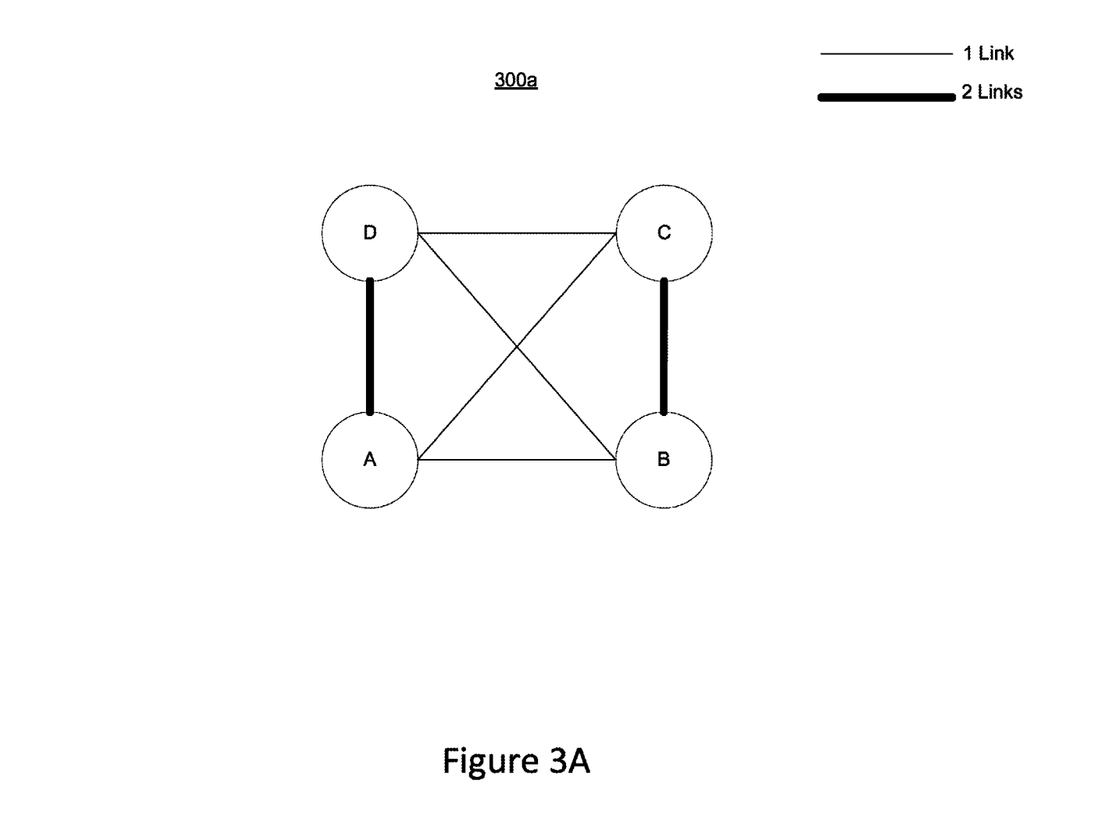
FIG. 3A shows an initial graph representing an example computer network.
Figure 3B:
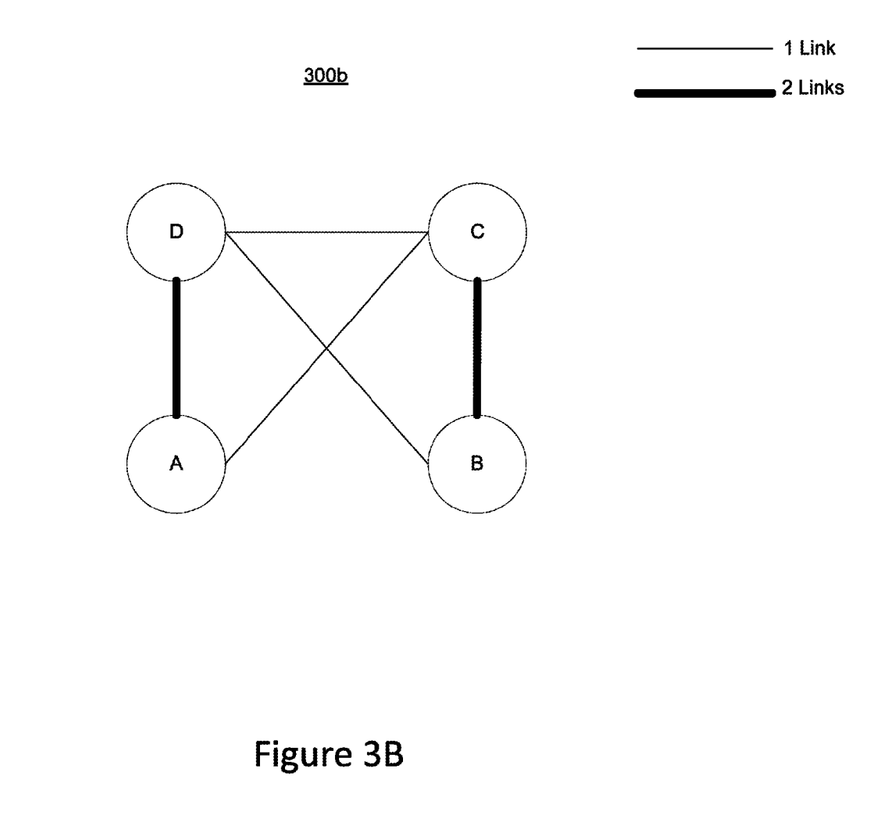
FIG. 3B shows a first residual graph representing the computer network shown in FIG. 3A after a first routing prioritization step.
Figure 3C:
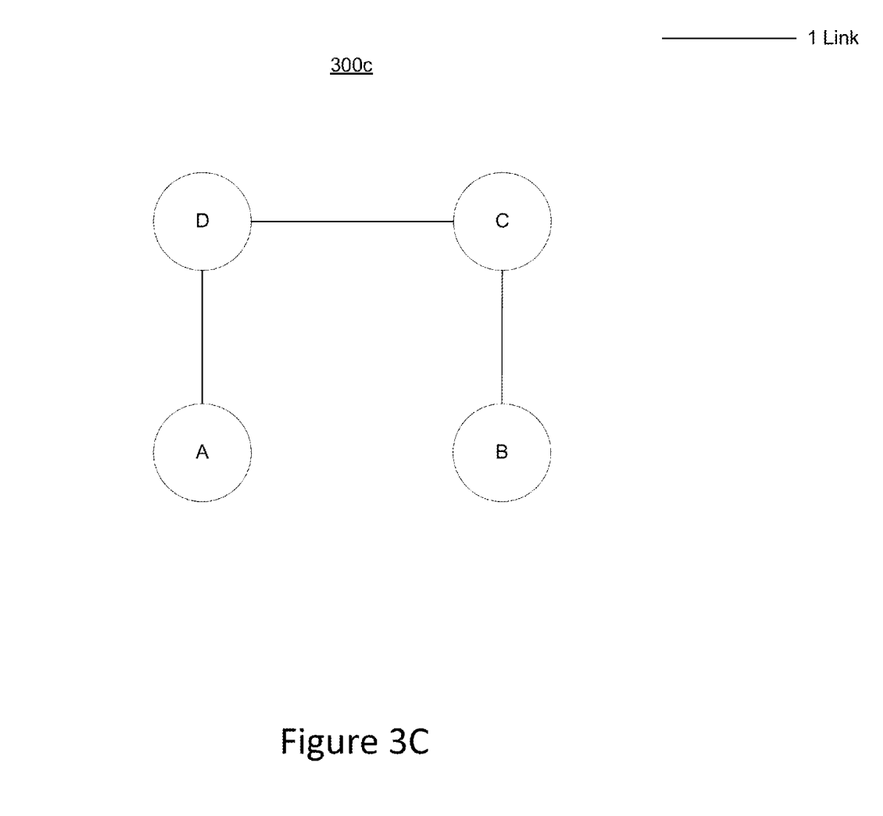
FIG. 3C shows a second residual graph representing the computer network shown in FIG. 3A after a second routing prioritization step.

FIGS. 3A-3C show a series of network graphs determined by a route determination module 120, illustrating an example execution of the method 200 shown in FIG. 2. FIG. 3A shows an initial graph 300a representing an example computer network. The graph includes four nodes labeled A-D. The nodes are connected by several links, representing communication paths along which data can be transmitted between the nodes. Some nodes may be joined by more than one link. For example, nodes A and D are joined by two links, as shown by the thicker line joining nodes A and D. Likewise, nodes B and C are joined by two links. All of the other links in the graph 300a are single links, which are represented by a thinner line. In some implementations, a double link may be two separate physical connections. In other implementations, a double link may be a single physical connection having twice the bandwidth capacity of the connections shown as single links. In some implementations, the nodes A-D can represent superblocks in a data center, such as the data center 100 shown in FIG. 1.

Referring to FIGS. 2 and 3A, the graph 300a may be determined (stage 204) by the routing determination module 120, for example. Data flows can be transmitted between the nodes of the graph 300a. In one example, node A is the source node and node B is the destination node for a given data flow (identified at stage 202) requiring four units of bandwidth. In this example, the shortest path between nodes A and B is determined (stage 206) to be the direct link between them (i.e., a one-hop path). This path can be identified, for example, by the routing determination module 120. Because this is a single link, one unit of bandwidth can be allocated to this link in stage 208 of the method 200. The identified data flow requires four units of bandwidth, so the condition of stage 210 is not satisfied and the next step of the method is to determine a residual graph (stage 216), which is shown in FIG. 3B.

FIG. 3B shows a first residual graph 300b representing the computer network shown in FIG. 3A after a first routing allocation iteration. The first residual graph 300b is computed by subtracting the saturated links from the initial graph 300a. Therefore, the first residual graph 300b is shown without the link joining the source node A to the destination node B. Steps 206-210 of the method 200 can then be repeated using the first residual graph 300b.

In this example, the shortest path joining nodes A and B is two hops. There are two such two-hop paths (i.e., path and path A→C→B). Although each of these paths includes a double link, the single link in each path limits the potential throughput, so each of these paths can be allocated one unit of bandwidth. The first residual graph 300b therefore supports two units of bandwidth. The initial graph 300a supported one unit of bandwidth, so the total bandwidth allocated between nodes A and B is now three units. This is still not sufficient for the identified data flow, which requires four units of bandwidth. Therefore, a second residual graph can be generated and the appropriate stages of the method 200 can be repeated.

FIG. 3C shows a second residual graph 300c representing the computer network shown in FIG. 3A after a second routing allocation iteration. The second residual graph 300c is determined by subtracting the links from the first residual graph 300b that were saturated in the previous iteration. Although one link has been deleted between nodes A and D and between nodes B and C, these node pairs are still joined by a link, because the first residual graph 300b included a double link between these node pairs.

The shortest path from the source node A to the destination node B in the second residual graph 300c is the three-hop path A→D→C→B. This path can be allocated one unit of bandwidth, bringing the total bandwidth allocation between nodes A and B to four units. The total allocation therefore meets the requirement of the identified data flow, which is four units. The paths and bandwidth allocations can thus be output to and implemented by the network nodes A-D, in accordance with stages 214 and 216 of the method 200. That is, since one unit of traffic was allocated to each of paths A→B, A→D→B, A→C→B and A→D→C→B, the source node is directed to send 25% of the data associated with the flow across each of the respective routes.

Figure 4A:
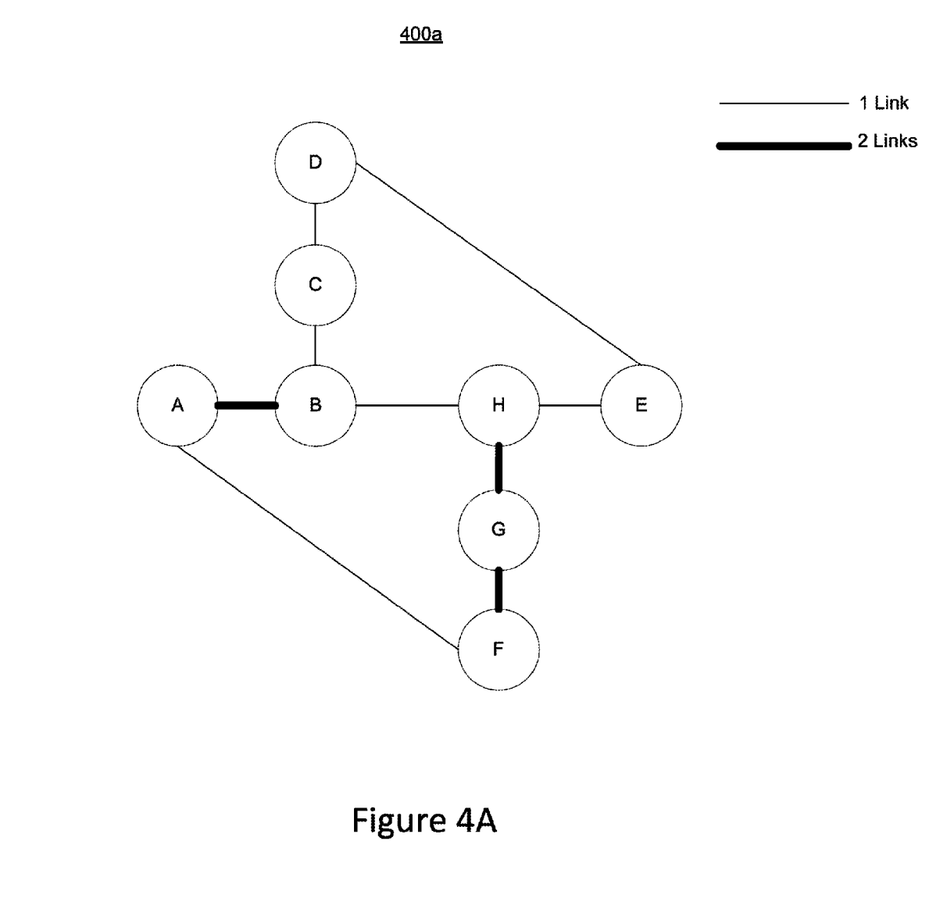
FIG. 4A shows an initial graph representing another example computer network.
Figure 4B:
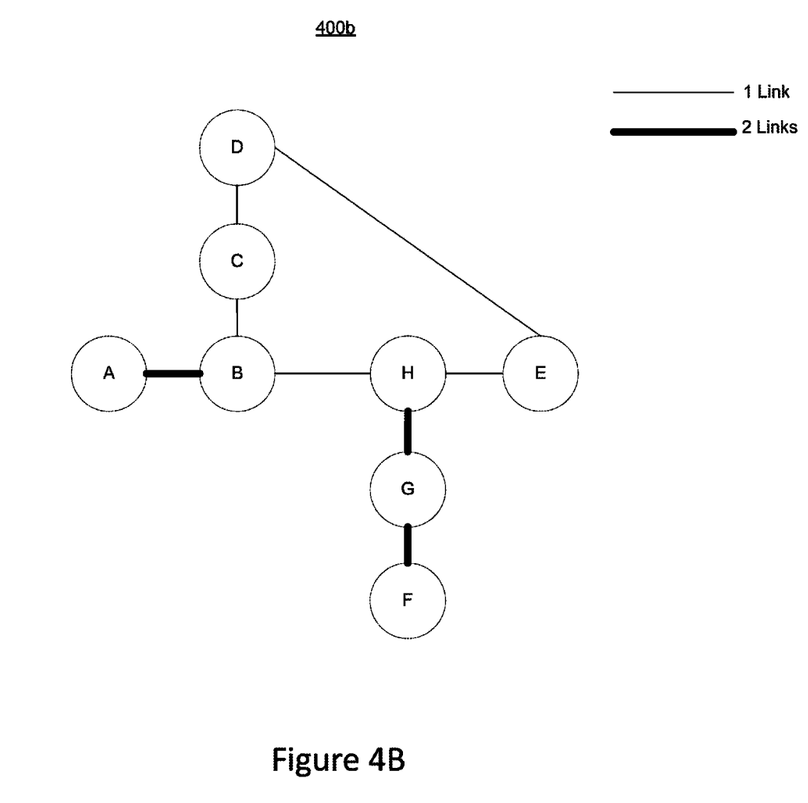
FIG. 4B shows a first residual graph representing the computer network shown in FIG. 4A after a first routing prioritization step.
Figure 4C:
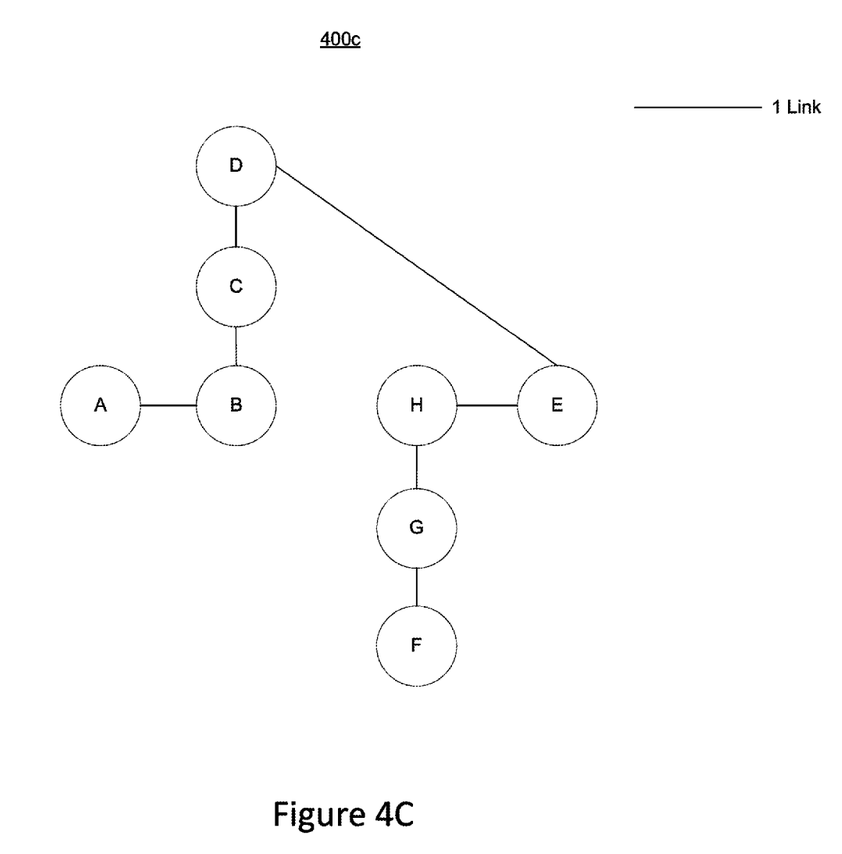
FIG. 4C shows a second residual graph representing the computer network shown in FIG. 4A after a second routing prioritization step.

FIGS. 4A-4C illustrate another example execution of the method 200 using a more complicated network graph. FIG. 4A shows an initial graph 400a representing another example computer network. The graph includes eight nodes labeled A-H. The nodes are connected by several links, representing communication paths along which data can be transmitted between the nodes. Some nodes may be joined by more than one link. For example, nodes A and B are joined by two links, as shown by the thicker line joining nodes A and D. Likewise, nodes F and G and nodes G and H are joined by two links. All of the other links in the graph 400a are single links, which are represented by a thinner line. In some implementations, a double link may be two separate physical connections. In other implementations, a double link may be a single physical connection having twice the bandwidth capacity of the connections shown as single links.

In some implementations, the nodes A-H can represent superblocks in a data center, such as the data center 100 shown in FIG. 1. The graph 400a may be determined by the routing determination module 120, for example. Data flows can be transmitted between the nodes of the graph 400a. In one example, node A is the source node and node F is the destination node for a given data flow requiring three units of bandwidth. The data flow has been identified and the graph 400a has been determined, corresponding to stages 202 and 204 of the method 200 shown in FIG. 2, respectively. In this example, the shortest path between nodes A and F in the initial graph is the direct link between them (i.e., a one hop path). This path can be identified, for example, by the routing determination module 120 shown in FIG. 1, as discussed above in connection with stage 206 of the method 200 shown in FIG. 2. The determination corresponds to step 206 of the method 200. Because this is a single link, one unit of bandwidth can be allocated to this link in step 208 of the method 200. The identified data flow requires three units of bandwidth, but only one has been identified, so the condition of stage 210 has not been satisfied and the next step of the method is to determine the residual graph, which is shown in FIG. 4B.

FIG. 4B shows a first residual graph 400b representing the computer network shown in FIG. 4A after a first routing allocation iteration. The first residual graph 400b is computed by subtracting the saturated link (i.e., the link connecting nodes A and F) from the initial graph 400a. Therefore, the first residual graph 400b is shown without the link joining the source node A and the destination node F. Steps 206-210 of the method 200 can then be repeated using the first residual graph 400b.

In this example, there are no two-hop paths or three-hop paths in the first residual graph 400b. The shortest path joining nodes A and B is the four-hop path A→B→H→G→F. Some of the links along this path are double links, but the single link joining nodes B and H limits the bandwidth that may be allocated on this path to one unit. The first residual graph 400b therefore supports one unit of bandwidth. The initial graph 400a supported one unit of bandwidth, so the total bandwidth allocated between nodes A and B is two units. This is still not sufficient for the identified data flow, which requires three units of bandwidth. Therefore, a second residual graph can be generated and the appropriate stages of the method 200 can be repeated.

FIG. 4C shows a second residual graph 400c representing the computer network shown in FIG. 4A after a second routing allocation iteration. The second residual graph 400c is determined by subtracting the links allocated in the previous step from the first residual graph 400b. Although one link has been deleted between nodes A and B, nodes F and G, and nodes G and H, these node pairs are still joined by a link, because the first residual graph 400b included a double link between these node pairs. The single link between nodes B and H in the first residual graph 400b is also deleted. As a result, nodes B and H are not connected in the second residual graph 400c.

The shortest path from the source node A to the destination node F in the second residual graph 400c is the seven-hop path A→B→C→D→E→H→G→F. This path can be allocated one unit of bandwidth, bringing the total bandwidth allocation between nodes A and B to three units. The total allocation therefore meets the requirement of the identified data flow, which is three units. The paths and bandwidth allocations can thus be output to and implemented by the network nodes A-H, in accordance with stages 214 and 216 of the method 200. The source node A will therefore send one third of its traffic associated with the flow along each of the three identified paths.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus.

A computer readable medium can be, or be included in, a computer-readable storage device, a computer-readable storage substrate, a random or serial access memory array or device, or a combination of one or more of them. Moreover, while a computer readable medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer readable medium is tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method for managing computer network activity, the method comprising:
identifying, by a routing determination module, a data flow having a bandwidth demand including a plurality of network packets to be transmitted between a source node and a destination node in the computer network;
determining a routing allocation for the data flow by:
obtaining an initial network graph for the computer network;
iteratively, only until the bandwidth demand of the data flow has been satisfied:
identifying, by the routing determination module, a shortest path between the source node and the destination node based on a most recently obtained network graph;
allocating for the data flow, by the routing determination module, bandwidth to communication links along the identified shortest path;
determining, by the routing determination module, whether the bandwidth demand associated with the data flow is satisfied by the allocated bandwidth; and
in response to determining that the bandwidth demand of the data flow has not been satisfied, obtaining, by the routing determination module, a residual graph, wherein obtaining the residual graph comprises obtaining a representation of all unallocated communication links and all network nodes connected to the unallocated communication links;

and outputting the determined routing allocation to the source node to cause the source node to implement the determined routing allocation.

2. The computer-implemented method of claim 1, further comprising:
processing the data flow in accordance with the routing allocation.

3. The computer-implemented method of claim 1, further comprising:
broadcasting, by each node in the network, a position of the respective node relative to the source node.

4. The computer-implemented method of claim 1, wherein identifying a shortest path between the source node and the destination node comprises identifying a path having a fewest number of network hops separating the source node from the destination node.

5. The computer-implemented method of claim 1, wherein identifying a data flow comprises identifying a scheduled data flow prior to transmission of the plurality of network packets.

6. The computer-implemented method of claim 1, wherein the computer network includes a data center and the network nodes include servers in the data center.

7. A system for managing computer network activity, the system comprising:
a plurality of network nodes; and
a routing determination module configured to:
identify a data flow having a bandwidth demand including a plurality of network packets to be transmitted between a source node and a destination node in the computer network;
identify a routing allocation for the data flow by
obtaining an initial network graph for the computer network;
iteratively, only until the bandwidth demand of the data flow has been satisfied:
identifying a shortest path between the source node and the destination node based on a most recently obtained network graph;
allocating bandwidth for the data flow to communication links along the identified shortest path;
determining whether the bandwidth demand associated with the data flow is satisfied by the allocated bandwidth; and
in response to determining that the bandwidth demand of the data flow has not been satisfied, obtaining a residual graph, wherein the routing determination module is further configured to obtain the residual graph by obtaining a representation of all unallocated communication links and all network nodes connected to the unallocated communication links;
and outputting the determined routing allocation to the source node.

8. The system of claim 7, wherein the routing determination module is further configured to:
process the data flow in accordance with the bandwidth allocation.

9. The system of claim 7, wherein each network node is configured to broadcast a position of the respective node relative to the source node.

10. The system of claim 7, wherein the routing determination module is further configured to identify a shortest path between the source node and the destination node by identifying a path having a fewest number of network hops separating the source node from the destination node.

11. The system of claim 7, wherein the routing determination module is further configured to identify a data flow by identifying a scheduled data flow prior to transmission of the plurality of network packets.

12. The system of claim 7, wherein the plurality of network nodes include servers in a data center.

13. A non-transitory computer-readable storage medium having instructions encoded thereon which, when executed by a processor, cause the processor to perform a method for managing computer network activity, the method comprising:
identifying a data flow having a bandwidth demand including a plurality of network packets to be transmitted between a source node and a destination node in the computer network;
determining a routing allocation for the data flow by:
obtaining an initial network graph for the computer network;
iteratively, only until the bandwidth demand of the data flow has been satisfied:
identifying a shortest path between the source node and the destination node based on a most recently obtained network graph;
allocating bandwidth for the data flow to communication links along the identified shortest path;
determining whether the bandwidth demand associated with the data flow is satisfied by the allocated bandwidth; and
in response to determining that the bandwidth demand of the data flow has not been satisfied, obtaining a residual graph, wherein the instructions, when executed by the processor, further cause the processor to obtain the residual graph by obtaining a representation of all unallocated communication links and all network nodes connected to the unallocated communication links;
and outputting the determined routing allocation to the source node.

14. The non-transitory computer-readable storage medium of claim 13, wherein the instructions, when executed by the processor, further cause the processor to:
process the data flow in accordance with the routing allocation.

15. The non-transitory computer-readable storage medium of claim 13, wherein the method further comprises:
broadcasting, by each node in the network, a position of the respective node relative to the source node.

16. The non-transitory computer-readable storage medium of claim 13, wherein the instructions, when executed by the processor, further cause the processor to:
identify a shortest path between the source node and the destination node by identifying a path having a fewest number of network hops separating the source node from the destination node.

17. The non-transitory computer-readable storage medium of claim 13, wherein the instructions, when executed by the processor, further cause the processor to:
identify a data flow by identifying a scheduled data flow prior to transmission of the plurality of network packets.

18. The non-transitory computer-readable storage medium of claim 13, wherein the instructions, when executed by the processor, further cause the processor to:

identify a data flow by identifying a communication flow between at least two servers within a data center.

* * * * *